US011690121B2

(12) United States Patent
Cai et al.

(10) Patent No.: US 11,690,121 B2
(45) Date of Patent: Jun. 27, 2023

(54) CLIENT DEVICE AND NETWORK ACCESS NODE FOR CONTROLLING A RADIO LINK FAILURE TIMER

(71) Applicant: HUAWEI TECHNOLOGIES CO., LTD., Shenzhen (CN)

(72) Inventors: Tao Cai, Kista (SE); Peng Wang, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/998,896

(22) Filed: Aug. 20, 2020

(65) Prior Publication Data

US 2020/0383162 A1 Dec. 3, 2020

Related U.S. Application Data

(63) Continuation of application No. PCT/EP2018/054281, filed on Feb. 21, 2018.

(51) Int. Cl.
*H04W 76/18* (2018.01)
*H04W 36/00* (2009.01)
(Continued)

(52) U.S. Cl.
CPC .......... *H04W 76/18* (2018.02); *H04W 24/08* (2013.01); *H04W 36/0079* (2018.08); *H04W 76/38* (2018.02)

(58) Field of Classification Search
CPC . H04W 76/18; H04W 24/08; H04W 36/0079; H04W 76/38; H04W 76/19; H04W 56/00; H04W 72/046
See application file for complete search history.

(56) References Cited

U.S. PATENT DOCUMENTS

2011/0217973 A1* 9/2011 Sagfors .................. H04L 69/32
455/423
2015/0078224 A1 3/2015 Xiong et al.
(Continued)

FOREIGN PATENT DOCUMENTS

CN 105144774 A 12/2015
CN 105519228 A 4/2016
(Continued)

OTHER PUBLICATIONS

Nokia et al., "Radio Link Monitoring and Beam Recovery in NR," 3GPP TSG-RAN WG2 Meeting #97bis R2-1703554, Spokane, USA, Apr. 3-7, 2017, pp. 1-3; (Year: 2017).*
Intel, "Radio link monitoring, beam failure and radio link failure," 3GPP TSG-RAN WG2 Meeting #97bis R2-1703423, Spokane, USA , Apr. 3-7, 2017, pp. 1-5 (Year: 2017).*
Qualcomm, "Considerations of RLM and RLF in NR," 3GPP TSG-RAN WG2 Meeting #97bis R2-1703563, Spokane, USA, Apr. 3-7, 2017, pp. 1-4 (Year: 2017).*
(Continued)

*Primary Examiner* — Un C Cho
*Assistant Examiner* — Lalita W Pace
(74) *Attorney, Agent, or Firm* — Hauptman Ham, LLP (57) ABSTRACT

A client device includes a processor and a memory. The client device is caused to obtain a first indication indicating an outcome of a link monitoring procedure associated with a serving link between a network access node and the client device. The client device is also caused to obtain a second indication indicating an outcome of a link re-configuration procedure associated with the serving link. The client device is further caused to determine a value of a first counter associated with a radio link failure timer based on the first indication and the second indication. The client device is additionally caused to start the radio link failure timer when the value of the first counter is equal to or larger than a first counter threshold value.

10 Claims, 4 Drawing Sheets

(51) Int. Cl.
*H04W 76/38* (2018.01)
*H04W 24/08* (2009.01)

(56) References Cited

U.S. PATENT DOCUMENTS

| | | | |
|---|---|---|---|
| 2015/0156657 A1* | 6/2015 | Ji | H04W 56/001 370/336 |
| 2016/0345217 A1 | 11/2016 | Tabet et al. | |
| 2019/0028174 A1* | 1/2019 | Chakraborty | H04B 7/0408 |
| 2019/0052342 A1* | 2/2019 | Maattanen | H04B 7/0695 |
| 2019/0081689 A1* | 3/2019 | Yu | H04B 7/088 |
| 2019/0116506 A1* | 4/2019 | Bendlin | H04B 17/318 |
| 2020/0337103 A1* | 10/2020 | Harada | H04W 24/08 |
| 2020/0359241 A1* | 11/2020 | Siomina | H04B 7/0617 |
| 2020/0389350 A1* | 12/2020 | Harada | H04B 7/0417 |
| 2021/0006998 A1* | 1/2021 | Xu | H04B 17/309 |
| 2021/0105171 A1* | 4/2021 | Chen | H04W 72/04 |

FOREIGN PATENT DOCUMENTS

| | | |
|---|---|---|
| CN | 105745960 A | 7/2016 |
| CN | 111133707 A | 5/2020 |
| WO | 2014066359 A1 | 5/2014 |
| WO | WO-2019028728 A1 * | 2/2019 ......... H04W 36/305 |

OTHER PUBLICATIONS

Huawei et al.,"RLM and Beam Failure Recovery Procedure",3GPP TSG RAN WG1 Meeting NR#3 R1-1715391, Nagoya, Japan, Sep. 18-21, 2017, total 4 pages.
Huawei et al.,"RLF for NR",3GPP TSG-RAN WG2-NR Adhoc#2 R2-1706745,Qingdao, China, Jun. 27-29, 2017, total 7 pages.
Ericsson,"Beam recovery impact to RLF triggering",3GPP TSG-RAN WG2 NR #101 Tdoc R2-1802768,Athens, Greece, Feb. 26-Mar. 2, 2018,total 6 pages.
3GPP TS 36.331 V12.4.1 (Dec. 2014);3rd Generation Partnership Project;Technical Specification Group Radio Access Network;Evolved Universal Terrestrial Radio Access (E-UTRA);Radio Resource Control (RRC);Protocol specification (Release 12);total 408 pages.
Ericsson,"Radio link monitoring",3GPP TSG-RAN WG1 NR Ad Hoc #3 R1-1716157,Nagoya, Japan, Sep. 18-21, 2017,total 6 pages.
International Search Report issued in corresponding International Application No. PCT/EP2018/054281, dated Nov. 11, 2018, pp. 1-12, European Patent Office, Rijswijk, Netherlands.
Chinese Office Action issued in corresponding Chinese Application No. 201880089254.1, dated Oct. 12, 2021, pp. 1-17.

* cited by examiner

CLIENT DEVICE AND NETWORK ACCESS NODE FOR CONTROLLING A RADIO LINK FAILURE TIMER

CROSS REFERENCE TO RELATED APPLICATION

This application is a continuation of International Application No. PCT/EP2018/054281, filed on Feb. 21, 2018. The aforementioned application is hereby incorporated by reference in its entirety.

TECHNICAL FIELD

The disclosure relates to a client device and a network access node. Furthermore, the disclosure also relates to corresponding methods and a computer program.

BACKGROUND

In the context of next generation (5G) wireless networks, both low frequency radio and high frequency radio are considered to be used for the purpose of establishing radio links between network nodes and user nodes within a wireless access network. Within 3GPP standardization for 5G, low frequency (LF) and high frequency (HF) are defined as the frequencies below and above 6 GHz, respectively. HF band can be around 30 GHz or 60 GHz, and LF band can be around 3 GHz or 4 GHz. For HF radio multiple antennas and beamforming will be needed to combat the high path loss at such high radio frequencies.

There are two special aspects of HF radio related to antenna design that needs to be considered. One is that an HF antenna captures less signal energy than a LF antenna and the other that an HF antenna captures more noise power than a LF antenna. The former is due to higher frequency and smaller antenna aperture, and the latter is due to normally wider HF radio channel bandwidth. Hence, HF radio suffers from lower signal-to-noise ratio than LF radio. However, the lower signal-to-noise ratio can be compensated by higher antenna gains with higher antenna directionality. Due to its smaller wavelength, the antenna size is typically smaller for HF radio than in LF applications. The transmitter and receiver of HF radio can therefore accommodate more antenna elements. With a larger number of antenna elements narrower beams can be produced which will yield higher antenna gains. The beam can be formed through a phase control system such that the direction, as well as the beam width can be adjusted. Narrower beam is beneficial for providing higher antenna gains, causing less multi-path fading as well as minimizing cross beam interference.

The large available bandwidth and the high antenna gain available with HF radio make HF radio links suitable to provide very high data throughput between network access nodes and user nodes. However, the high directivity of narrow beam makes the HF radio link fragile as the alignment of beams between the transmitter and receiver can easily be lost, e.g. due to the movement and/or rotation of the user node. Furthermore, the HF radio link can be blocked by obstacles such as buildings and vehicles between the transmitter and the receiver, due to the high penetration loss and lack of diffraction of HF radio links.

In wireless networks, the radio link quality is constantly monitored through radio link measurement on certain reference signals, pilot signals or synchronization signals. According to 3GPP LTE, so called "out of sync" (OOS) is indicated by physical layer (PHY) if the PHY measurement value is below a threshold value, while so called "in sync" (IS) is indicated if the PHY measurement value is above another threshold value. When the medium access layer (MAC) receives a certain number of consecutive OOS indications, it starts a timer. If MAC does not receive a certain number of consecutive IS indications from PHY before the timer expires, MAC will announce it has detected a radio link failure (RLF) to a higher layer. After the RLF is detected, the user node initiates a radio link re-establishment operation to connect to another best available cell.

The radio link re-establishment will be based on random access operation to the best available cell through physical random access channel (PRACH) where the user node will try retransmission on the PRACH if no response is received from any cells and may apply power ramping. If all PRACH attempts on the same carrier frequency fail, the user node will try to connect to another carrier frequency or radio access technology (RAT).

The radio link re-establishment procedure is time consuming and may not be suitable for the recovery of HF narrow beam failures. In LF radio scenarios, the radio link quality degradation leading to a RLF is typically caused by large path loss and shadow fading. Performing a radio link re-establishment procedure to re-connect to another cell is suitable to solve such link quality degradations. For HF radio links on the other hand, a radio link quality degradation can be caused by temporary beam miss-alignment or blockage, such as e.g. a moving vehicle. In such situations, it may not be suitable to declare a RLF and trigger the time and resource consuming radio link re-establishment procedure due to a temporary radio link quality variation.

SUMMARY

An objective of embodiments of the disclosure is to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a client device for a wireless communication system, the client device being configured to
- obtain a first indication indicating an outcome of a link monitoring procedure associated with a serving link between a network access node and the client device;
- obtain a second indication indicating an outcome of a link re-configuration procedure associated with the serving link;
- determine a value of a first counter associated with a radio link failure timer based on the first indication and the second indication;
- start the radio link failure timer when the value of the first counter is equal to or larger than a first counter threshold value.

A serving link can in this disclosure be understood to mean a wireless connection between the network access node and the client device used for communication. The serving link may comprise one or more beam pairs, where a beam pair collectively describes the direction of transmission of signals and direction of reception of signals of a radio transceiver. Hence, a specific beam can be interpreted as a certain spatial parameter setting or spatial filtering of the radio transceiver. These settings or parameters may for instance be determined in the client device and used in the client device radio transceiver configuration for directing the transmission of signals or reception of signals in a certain direction. These settings or parameters may further be determined and used in the network access node.

That the radio link failure timer is started can in this disclosure be understood to mean that the radio link failure timer is initiated with a predefined value and starts to count down towards zero. The radio link failure timer could also be implemented to instead start from zero and count up towards the predefined value. Once the radio link failure timer expires, i.e. reaches zero or the predefined value, depending on implementation, a radio link failure may be declared.

An advantage of the client device according to the first aspect is that the value of the first counter is dependent on the outputs of both the link monitoring procedure and the link re-configuration procedure. Hence, the time instance at which the radio link failure timer starts, hereafter denoted the start time of the radio link failure timer, reflects both the quality of the current serving link and the availability and quality of a suitable candidate link. This results in that the start time of the radio link failure timer can be optimized based on the radio link properties experienced by the client device. Thereby, declaration of radio link failure for short term variation of the radio link quality can be postponed or avoided. Furthermore, if the client device is in a location with long term unfavourable radio conditions, a radio link failure can be declared earlier than it would have been if conventional solutions were used.

In an implementation form of a client device according to the first aspect, the client device is further configured to
determine a value of a second counter associated with the radio link failure timer based on the first indication and the second indication;
reset the radio link failure timer when the value of the second counter is equal to or larger than a second counter threshold value.

That the radio link failure timer is reset can in this disclosure be understood to mean that the radio link failure timer is stopped, and no information is stored about the remaining time of the radio link failure timer. Hence, when the radio link failure timer is started again the radio link failure timer will start anew.

An advantage with this implementation form is that the value of the second counter is dependent on the outputs of both the link monitoring procedure and the link re-configuration procedure. Hence, the time instance at which the radio link failure timer is reset, hereafter denoted the reset time of the radio link failure timer, can be adapted based on the radio link properties experienced by the client device. Thereby, the triggering of the radio link re-establishment can be postponed or avoided if a radio link failure is caused by short term variation of the radio link quality. In addition, if the client device is in a location with long term unfavourable radio conditions, the radio link re-establishment can be triggered earlier than it would have been if conventional solutions were used.

In an implementation form of a client device according to the first aspect, the client device is further configured to
determine the value of the second counter after the radio link failure timer has been started.

An advantage with this implementation form is that processing resources can be saved in the client device as the client device does not need to determine the value of the second counter before the radio link failure timer has been started.

In an implementation form of a client device according to the first aspect, the client device is further configured to
increase the value of the first counter when the first indication indicates that the serving link is out of synchronization; or
set the value of the first counter to zero when the first indication indicates that the serving link is in synchronization.

That the serving link is out of synchronization can in this disclosure be understood to mean that the radio link quality of the serving link is not sufficient for communication, e.g. below a quality threshold value, while in synchronisation can be understood to mean that the radio link quality of the serving link is sufficient for communication, e.g. above a quality threshold value.

An advantage with this implementation form is that the start time of the radio link failure timer can reflect the out of synchronization or the in synchronization property of the serving link.

In an implementation form of a client device according to the first aspect, the client device is further configured to
increase the value of the first counter by an increment value when the first indication indicates that the serving link is out of synchronization.

An advantage with this implementation form is that the start time of the radio link failure timer can be adapted with the increment value.

In an implementation form of a client device according to the first aspect, the client device is further configured to at least one of
increase the value of the first counter by an amount defined by a first increment parameter when the second indication indicates an unsuccessful outcome of the link re-configuration procedure;
decrease the value of the first counter by an amount defined by a first decrement function when the second indication indicates a successful outcome of the link re-configuration procedure.

An unsuccessful outcome of the link re-configuration procedure can in this disclosure be understood to mean that the link re-configuration procedure was not able to establish a new connection, while a successful outcome of the link re-configuration procedure can be understood to mean that the link re-configuration procedure was able to establish a new connection. The reason for an unsuccessful outcome of the link re-configuration procedure can be that the client device is unable to find a suitable candidate beam which has sufficient quality for the communication; or that the client device cannot, within a predefined time window, receive a confirmation from the network access node on the link re-configuration request which is sent from the client device to the network access node.

An advantage with this implementation form is that the change of the value of the first counter can reflect the successful or unsuccessful outcome of the link re-configuration procedure. The value of the first counter is increased when the link re-configuration procedure was unable to establish a new connection, such that the radio link failure timer can be started earlier than it would have been using conventional solutions. The first increment parameter is used as weighing parameter to adapt the effect of the unsuccessful outcome of the link re-configuration procedure. The value of the first counter is decreased when the link re-configuration procedure was able to establish a new connection, such that the start time of the radio link failure timer can be postponed and hence started later than it would have been using conventional solutions. An amount defined by a first decrement function is used as a weighing parameter to adapt the effect of the successful outcome of the link re-configuration procedure.

In an implementation form of a client device according to the first aspect, the first decrement function comprises one of:
- a reduction of the value of the first counter based on a first decrement function variable,
- a proportional scale-down of the value of the first counter based on a first decrement function variable,
- a reset of the value of the first counter to zero when a number of consecutive second indications indicating a successful outcome of the link re-configuration procedure are obtained, wherein the number of consecutive second indications is dependent on a first decrement function variable,
- a reset of the value of the first counter to zero when a number of non-consecutive second indications indicating a successful outcome of the link re-configuration procedure are obtained, wherein the number of non-consecutive second indications is dependent on a first decrement function variable.

An advantage with this implementation form is that the reduction of the value of the first counter based on a first decrement function variable provides a simple and straightforward reduction of the value of the first counter. The proportional scale-down of the value of the first counter based on a first decrement function variable provides a reduction step which is based on the current value of the first counter. The resetting of the value of the first counter to zero when a number of consecutive second indications are obtained provides a reset time which is based on the counting of consecutive second indications. Furthermore, the resetting of the value of the first counter to zero when a number of non-consecutive second indications are obtained provides a reset time which is based on the counting of non-consecutive second indications.

In an implementation form of a client device according to the first aspect, the client device is further configured to
- increase the value of the second counter when the first indication indicates that the serving link is in synchronization; or
- set the value of the second counter to zero when the first indication indicates that the serving link is out of synchronization.

An advantage with this implementation form is that the radio link failure timer can be reset if the first indication indicates that the quality of the serving link is good, and the resetting of the radio link failure timer can be delayed if the first indication indicates that the quality of the serving link is poor.

In an implementation form of a client device according to the first aspect, the client device is further configured to
- increase the value of the second counter by an increment value when the first indication indicates that the serving link is in synchronization.

An advantage with this implementation form is that the reset time of the radio link failure timer can be adapted with the increment value.

In an implementation form of a client device according to the first aspect, the client device is further configured to
- increase the value of the second counter by an amount defined by a second increment parameter when the second indication indicates a successful outcome of the link re-configuration procedure;
- decrease the value of the second counter by an amount defined by a second decrement function when the second indication indicates an unsuccessful outcome of the link re-configuration procedure.

An advantage with this implementation form is that the change of the value of the second counter can reflect the successful or unsuccessful outcome of the link re-configuration procedure. The value of the second counter is increased when the link re-configuration procedure was able to establish a new connection, such that the reset of the radio link failure timer can be triggered earlier than it would have been using conventional solutions. The second increment parameter is used as weighing parameter to adapt the effect of the successful outcome of the link re-configuration procedure. The value of the second counter is decreased when the link re-configuration procedure was unable to establish a new connection, such that the radio link failure recovery can be triggered earlier than it would have been using conventional solutions. An amount defined by a second decrement function is used as a weighing parameter to adapt the effect of the unsuccessful outcome of the link re-configuration procedure.

In an implementation form of a client device according to the first aspect, the second decrement function comprises one of:
- a reduction of the value of the second counter based on a second decrement function variable,
- a proportional scale-down of the value of the second counter based on a second decrement function variable,
- a reset of the value of the second counter to zero when a number of consecutive second indications indicating an unsuccessful outcome of the link re-configuration procedure are obtained, wherein the number of consecutive second indications is dependent on a second decrement function variable,
- a reset of the value of the second counter to zero when a number of non-consecutive second indications indicating an unsuccessful outcome of the link re-configuration procedure are obtained, wherein the number of non-consecutive second indications is dependent on a second decrement function variable.

An advantage with this implementation form is that the reduction of the value of the second counter based on a second decrement function variable provides a simple and straightforward reduction of the value of the second counter. The proportional scale-down of the value of the second counter based on a second decrement function variable provides a reduction step which is based on the current value of the second counter. The resetting of the value of the second counter to zero when a number of consecutive second indications are obtained provides a reset time which is based on the counting of consecutive second indications. Furthermore, the resetting of the value of the second counter to zero when a number of non-consecutive second indications are obtained provides a reset time which is based on the counting of non-consecutive second indications.

In an implementation form of a client device according to the first aspect, the client device is further configured to
- receive a control message from the network access node, wherein the control message indicates at least one of the first counter threshold value, the second counter threshold value, the first increment parameter, the second increment parameter, the first decrement function variable, the second decrement function variable, the first decrement function, and the second decrement function.

An advantage with this implementation form is that the network access node can control the start time and the reset time of radio link failure timer. Thereby, the network access node may control the occurrence of radio link failure declaration and thereafter radio link re-establishment by the client device.

In an implementation form of a client device according to the first aspect, at least one of the first counter threshold value, the second counter threshold value, the first increment parameter, the second increment parameter, the first decrement function variable, the second decrement function variable, the first decrement function, and the second decrement function is pre-defined in the client device.

An advantage with this implementation form is that the start time and the reset time of the radio link failure timer can be controlled in a simple and straightforward manner.

In an implementation form of a client device according to the first aspect, the client device is further configured to
declare a radio link failure when the radio link failure timer expires.

To declare a radio link failure can in this disclosure be understood to be an internal procedure within the client device.

An advantage with this implementation form is that the client device can determine which procedure to invoke to solve a radio link problem.

In an implementation form of a client device according to the first aspect, the radio link failure timer is a T310 timer.

An advantage with this implementation form is that an existing timer can be used, thereby simplifying the implementation.

According to a second aspect of the disclosure, the above mentioned and other objectives are achieved with a network access node for a wireless communication system, the network access node being configured to
determine at least one of a first counter threshold value, a second counter threshold value, a first increment parameter, a second increment parameter, a first decrement function variable, a second decrement function variable, a first decrement function, and a second decrement function for adjusting a value of a first counter or a value of a second counter associated with a radio link failure timer of a client device, wherein The value of the first counter and the value of the second counter are determined based on a first indication indicating an outcome of a link monitoring procedure associated with a serving link between the network access node and the client device and a second indication indicating an outcome of a link re-configuration procedure associated with the serving link;
generate a control message indicating at least one of the first counter threshold value, the second counter threshold value, the first increment parameter, the second increment parameter, the first decrement function variable, the second decrement function variable, the first decrement function, and the second decrement function;
transmit the control message to the client device.

An advantage of the network access node according to the second aspect is that it enables the network access node to determine the radio link failure behaviour of the client device and thereby control the internal process and behaviour of the client device.

In an implementation form of a network access node according to the second aspect, the network access node is further configured to
determine at least one of the first counter threshold value, the second counter threshold value, the first increment parameter, the second increment parameter, the first decrement function variable, the second decrement function variable, the first decrement function, and the second decrement function based on statistics of radio link failure declarations for the client device.

An advantage with this implementation form is that it enables the network access node to determine the radio link failure behaviour of the client device based on previous radio link failure declarations for the client device.

In an implementation form of a network access node according to the second aspect, the network access node is further configured to
determine at least one of the first counter threshold value, the second counter threshold value, the first increment parameter, the second increment parameter, the first decrement function variable, the second decrement function variable, the first decrement function, and the second decrement function based on statistics of handover operations for the client device.

An advantage with this implementation form is that it enables the network access node to determine the radio link failure behaviour of the client device based on previous handover operations for the client device.

In an implementation form of a network access node according to the second aspect, the network access node is further configured to
determine at least one of the first counter threshold value, the second counter threshold value, the first increment parameter, the second increment parameter, the first decrement function variable, the second decrement function variable, the first decrement function, and the second decrement function based on any of a location information, a speed information, a statistics information of a number of candidate beams, and a statistics information of a quality of candidate beams of the client device.

An advantage with this implementation form is that it enables the network access node to determine the radio link failure behaviour of the client device based a location and a speed of the client device, and characteristic information about the radio environment where the client device is located.

In an implementation form of a network access node according to the second aspect, the network access node is further configured to
determine at least one of the first counter threshold value, the second counter threshold value, the first increment parameter, the second increment parameter, the first decrement function variable, the second decrement function variable, the first decrement function, and the second decrement function based on a load and radio resources of the network access node.

An advantage with this implementation form is that it enables the network access node to determine the radio link failure behaviour of the client device based on the availability of processing and radio resources in the network access node.

According to a third aspect of the disclosure, the above mentioned and other objectives are achieved with a method for a client device, the method comprises
obtaining a first indication indicating an outcome of a link monitoring procedure associated with a serving link between a network access node and the client device;
obtaining a second indication indicating an outcome of a link re-configuration procedure associated with the serving link;
determining a value of a first counter associated with a radio link failure timer based on the first indication and the second indication;

starting the radio link failure timer when the value of the first counter is equal to or larger than a first counter threshold value.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the disclosure, the above mentioned and other objectives are achieved with a method for a network access node, the method comprises
determining at least one of a first counter threshold value, a second counter threshold value, a first increment parameter, a second increment parameter, a first decrement function variable, a second decrement function variable, a first decrement function, and a second decrement function for adjusting a value of a first counter or a value of a second counter associated with a radio link failure timer of a client device;
generating a control message indicating at least one of the first counter threshold value, the second counter threshold value, the first increment parameter, the second increment parameter, the first decrement function variable, the second decrement function variable, the first decrement function, and the second decrement function;
transmitting the control message to the client device.

The method according to the fourth aspect can be extended into implementation forms corresponding to the implementation forms of the network access node according to the second aspect. Hence, an implementation form of the method comprises the feature(s) of the corresponding implementation form of the network access node.

The advantages of the methods according to the fourth aspect are the same as those for the corresponding implementation forms of the network access node according to the second aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the disclosure will be apparent from the following detailed description.

BRIEF DESCRIPTION OF THE DRAWINGS

The appended drawings are intended to clarify and explain different embodiments of the present disclosure, in which.

DETAILED DESCRIPTION

Figure 1:
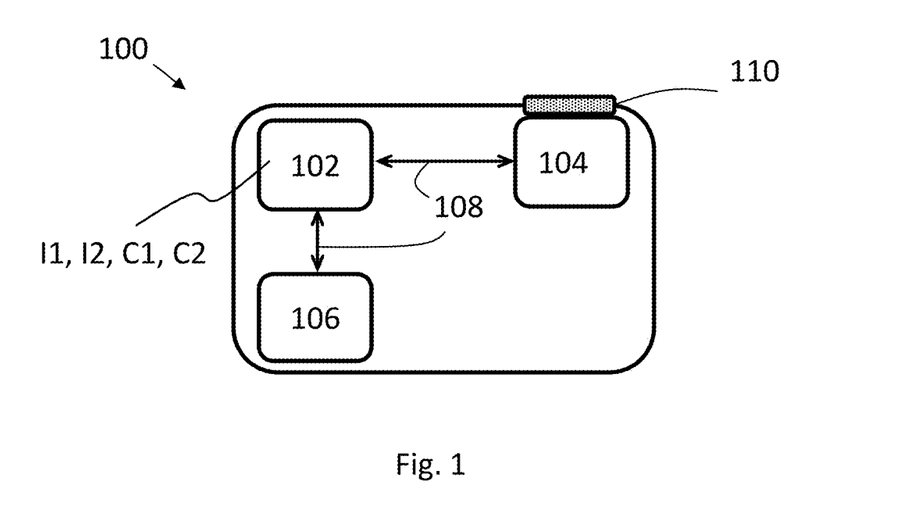
FIG. 1 shows a client device according to an example of the disclosure.

FIG. 1 shows a client device 100 according to an embodiment of the disclosure. In the embodiment shown in FIG. 1, the client device 100 comprises at least one processor 102, a transceiver 104 and a memory 106. The processor 102 is coupled to the transceiver 104 and the memory 106 by communication means 108 known in the art. The memory 106 may store program code that, when being executed, causes the processor 102 of the client device 100 to perform the functions and actions described herein. The client device 100 further comprises an antenna 110 coupled to the transceiver 104, which means that the client device 100 is configured for wireless communications in a wireless communication system.

That the client device 100 is configured to perform certain functions or actions can in this disclosure be understood to mean that the client device 100 comprises suitable means, such as e.g. the processor 102, configured to perform said functions or actions.

The client device 100 in FIG. 1 is configured to obtain a first indication I1 indicating an outcome of a link monitoring procedure associated with a serving link 512 (shown in FIG. 5) between a network access node 300 (shown in FIG. 3) and the client device 100. The client device 100 is further configured to obtain a second indication I2 indicating an outcome of a link re-configuration procedure associated with the serving link 512. Furthermore, the client device 100 is configured to determine a value of a first counter C1 associated with a radio link failure timer T based on the first indication I1 and the second indication I2. The client device 100 is further configured to start the radio link failure timer T when or if the value of the first counter C1 is equal to or larger than a first counter threshold value $Th_{C1}$. As will be described below the first counter threshold value $Th_{C1}$ may be pre-defined in the client device 100 or received in a control message 502 from the network access node 300.

Figure 2:
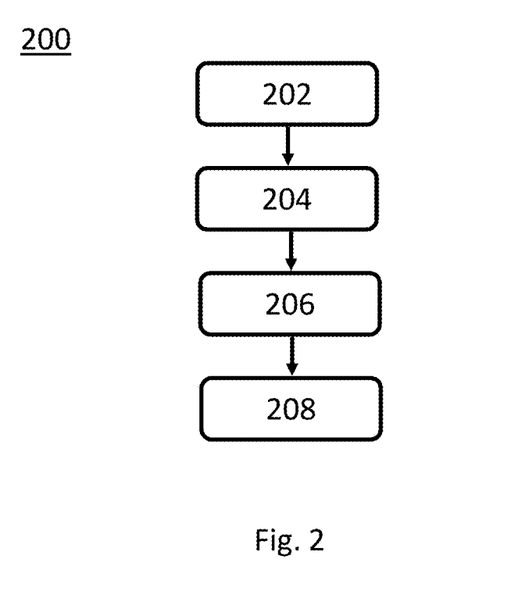
FIG. 2 shows a method according to an example of the disclosure.

FIG. 2 shows a flow chart of a corresponding method 200 which may be executed in a client device 100, such as the one shown in FIG. 1. The method 200 comprises obtaining 202 a first indication I1 indicating an outcome of a link monitoring procedure associated with a serving link 512 between a network access node 300 and the client device 100. The method 200 further comprises obtaining 204 a second indication I2 indicating an outcome of a link re-configuration procedure associated with the serving link 512. Furthermore, the method 200 comprises determining 206 a value of a first counter C1 associated with a radio link failure timer T based on the first indication I1 and the second indication I2. The method 200 further comprises starting 208 the radio link failure timer T when or if the value of the first counter C1 is equal to or larger than a first counter threshold value $Th_{C1}$.

Figure 3:
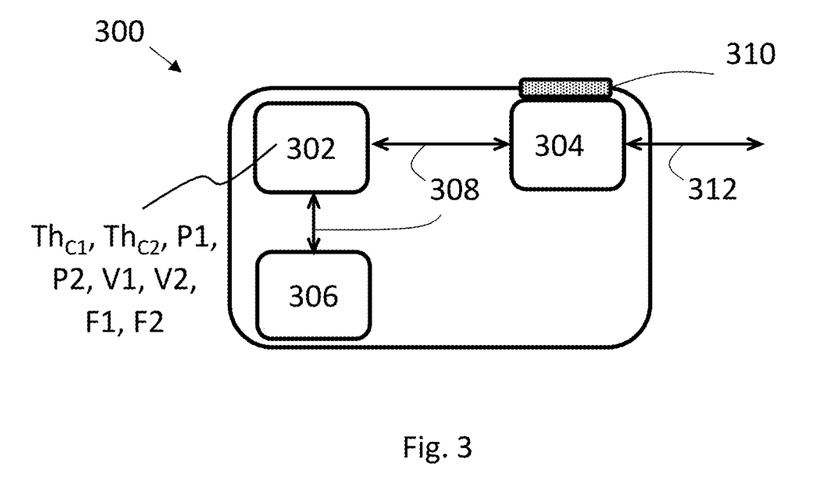
FIG. 3 shows a network access node according to an example of the disclosure.

FIG. 3 shows a network access node 300 according to an embodiment of the disclosure. In the embodiment shown in FIG. 3, the network access node 300 comprises at least one processor 302, a transceiver 304 and a memory 306. The processor 302 is coupled to the transceiver 304 and the memory 306 by communication means 308 known in the art. The memory 306 may store program code that, when being executed, causes the processor 302 of the network access node 300 to perform the functions and actions described herein. The network access node 300 may be configured for both wireless and wired communications in wireless and wired communication systems, respectively. The wireless communication capability is provided with an antenna 310 coupled to the transceiver 304, while the wired communication capability is provided with a wired communication interface 312 coupled to the transceiver 304.

That the network access node 300 is configured to perform certain actions should in this disclosure be understood to mean that the network access node 300 comprises suitable means, such as e.g. the processor 302 and the transceiver 304, configured to perform said actions.

The network access node 300 is configured to determine at least one of a first counter threshold value $Th_{C1}$, a second counter threshold value $Th_{C2}$, a first increment parameter P1, a second increment parameter P2, a first decrement function variable V1, a second decrement function variable V2, a first decrement function F1, and a second decrement function F2 for adjusting a value of a first counter C1 or a value of a second counter C2 associated with a radio link failure timer T of a client device 100. The network access node 300 is further configured to generate a control message 502 indicating at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2. Furthermore, the network access node 300 is configured to transmit the control message 502 to the client device 100, as will be further described with reference to FIG. 8.

Figure 4:
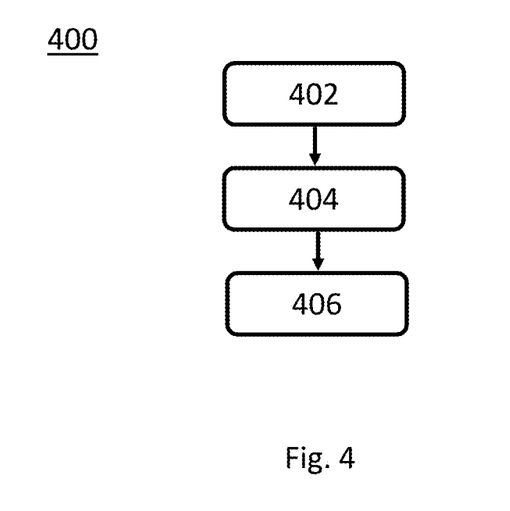
FIG. 4 shows a method according to an example of the disclosure.

FIG. 4 shows a flow chart of a corresponding method 400 which may be executed in a network access node 300, such as the one shown in FIG. 3. The method 400 comprises determining 402 at least one of a first counter threshold value $Th_{C1}$, a second counter threshold value $Th_{C2}$, a first increment parameter P1, a second increment parameter P2, a first decrement function variable V1, a second decrement function variable V2, a first decrement function F1, and a second decrement function F2 for adjusting a value of a first counter C1 or a value of a second counter C2 associated with a radio link failure timer T of a client device 100. The method 400 further comprises generating 404 a control message 502 indicating at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2. Furthermore, the method 400 comprises transmitting 406 the control message 502 to the client device 100.

Figure 5:
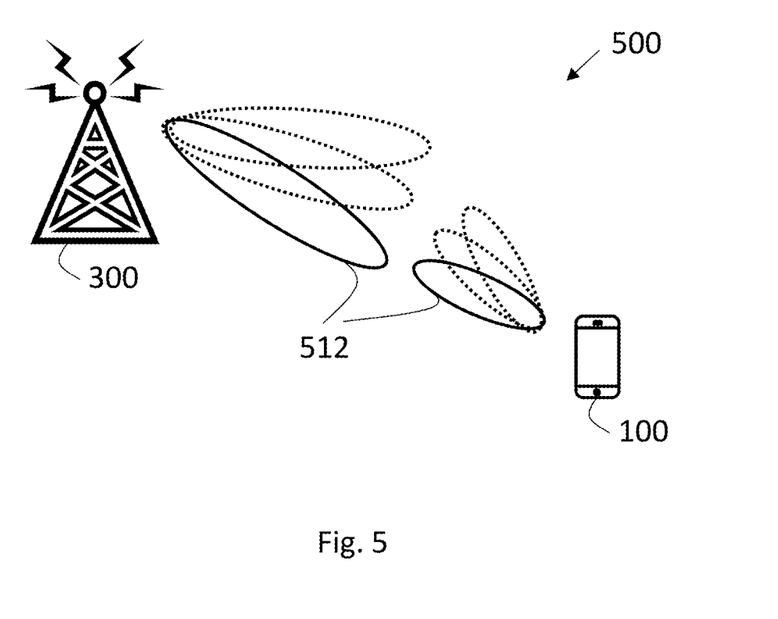
FIG. 5 shows a wireless communication system according to an example of the disclosure.

FIG. 5 shows a wireless communication system 500 according to an embodiment of the disclosure. The wireless communication system 500 comprises a client device 100 and a network access node 300, both configured to operate in the wireless communication system 500. For simplicity, the wireless communication system 500 shown in FIG. 5 only comprises one client device 100 and one network access node 300. However, the wireless communication system 500 may comprise any number of client devices 100 and any number of network access nodes 300 without deviating from the scope of the disclosure.

A serving link 512 provides a connection between the network access node 300 and the client device 100, over which the network access node 300 and the client device 100 can communicate. In the wireless communication system 500 of FIG. 5, beamforming is used and hence the serving link 512 may comprise one or more beams. In FIG. 5, the serving link 512 is illustrated as comprising one beam pair, where the beam pair in turn comprises a beam associated with the network access node transceiver 304 and a beam associated with the client device transceiver 104. However, the serving link 512 may comprise any number of beams without deviating from the scope of the disclosure. FIG. 5 further shows two candidate beams (shown with dashed lines in FIG. 5). A candidate beam may be a beam which is identified to be suitable, e.g. have sufficient quality, to become a serving beam in case the current serving beam fails.

In conventional systems, a radio link management procedure in the client device 100 monitors the radio link quality serving link 512 such that a radio link failure can be declared if the serving link 512 fails. The declared radio link failure may trigger an initiation by the client device 100 of a radio link re-establishment procedure. However, the conventional radio link management procedure does not consider whether beamforming is used and hence does not consider the aspect that a beam failure recovery function may recover the radio link failure such that no radio link re-establishment operation is needed.

In wireless communication systems using beamforming, such as the wireless communication system 500 shown in FIG. 5, the client device 100 is assumed to comprise beam management procedures, such as e.g. a beam failure recovery procedure. The beam failure recovery procedure will try to maintain connection with the network access node 300 through one or more serving beams. If all connections to the network access node 300 are down a beam failure recovery procedure may be triggered, e.g. after a certain number of consecutive beam failure instances are detected. In the embodiment shown in FIG. 5, this means that a beam failure recovery procedure will be triggered when the serving link 512 fails. The beam failure recovery procedure tries to identify a suitable candidate beam to replace the failed serving link 512. If a suitable candidate beam with sufficient radio link quality, e.g. a radio link quality above a quality threshold value, is identified the client device 100 transmits a beam failure recovery request to the network access node 300. Moreover, if the network access node 300 accepts the beam failure recovery request and the client device 100 receives a beam failure recovery response from the network access node 300, the candidate beam can be used to replace the failed serving link 512. In this case, the beam failure recovery is considered successful. On the other hand, if the beam failure recovery procedure is not able to identify a suitable candidate beam with sufficient quality or the beam failure recovery signalling with the network access node 300 fails, the beam failure recovery is considered unsuccessful.

A beam failure may be a temporary failure, e.g. due to misalignment or blockage, caused by rapid changes in the radio environment. A radio link failure, on the other hand, typically happens in a handover scenario or when a client device is located in a "coverage hole". The recovery of a radio link failure relies on the previously described radio link management procedure which triggers a radio link re-establishment procedure. However, the radio link re-establishment procedure is time consuming and should be avoided for temporary failures where the beam failure recovery procedure might find a suitable beam to maintain connection with the network access node 300. In addition, the radio link management procedure and the beam failure recovery procedure may be based on different synchronization or reference signals and may therefore reflect different aspects of the radio environment. The radio link management procedure may provide information about the quality of the current serving beam, while the beam failure recovery procedure may provide information about the existence and quality of suitable candidate beams or the qualities of both the serving and suitable candidate beam. Hence, it would be beneficial to consider the outcomes of both the radio link management procedure and the beam failure recovery procedure to determine when a radio link failure should be declared. For example, if out of synchronization indications are received and a beam failure recovery is unsuccessful, the connection is indeed in a failure state and no suitable candidate beams could be found. In this case, a radio link failure should be declared as early as possible. On the other hand, if out of synchronization indications are received but a beam failure recovery is successful, a suitable candidate beams has been found and the declaration of a radio link failure should be postponed. To optimize the declaration of radio link failures, the disclosure therefore provides ways for a client device 100 to determine when to start and reset a radio link failure timer based on indications from the radio link management procedure and the beam failure recovery procedure.

According to embodiments of the disclosure the client device 100 may control the start of a radio link failure timer T using a first counter C1, as will now be described with reference to FIG. 6. Furthermore, the client device 100 may control the reset of the radio link failure timer T using a second counter C2, as will be described further below with reference to FIG. 7.

Figure 6:
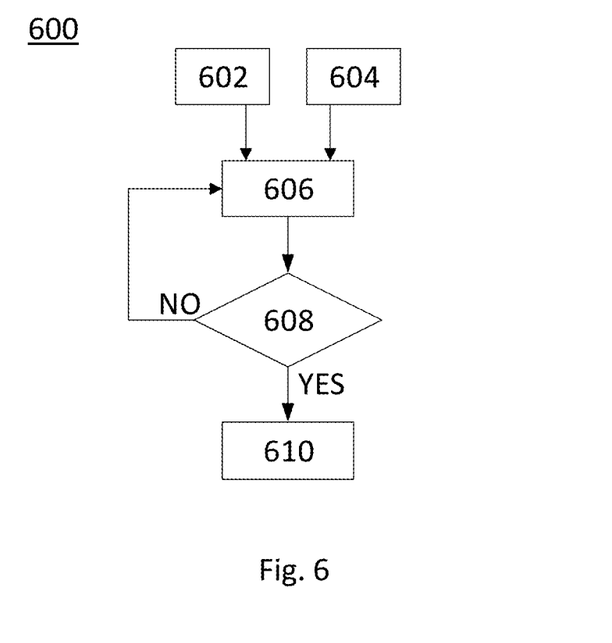
FIG. 6 shows a flow chart of a method for starting a radio link failure timer according to an example of the disclosure.

FIG. 6 shows a flow chart of a method 600 for starting a radio link failure timer T according to an embodiment of the disclosure. In this embodiment, the radio link failure timer T is started based a first counter C1, where the value of the first counter C1 is determined based on a first indication I1 and a second indication I2. The method 600 may be performed in a client device, such as e.g. the client device 100 shown in FIG. 1. In step 602, the client device 100 obtains a first indication I1. The first indication I1 indicates an outcome of a link monitoring procedure associated with a serving link 512 between a network access node 300 and the client device 100. The outcome of the link monitoring procedure associated with a serving link 512 may be that the serving link 512 is out of synchronization or that the serving link 512 is in synchronization. Hence, the first indication I1 may indicate that the serving link 512 is out of synchronization or that the serving link 512 is in synchronization. That the serving link 512 is out of synchronization can in this disclosure be understood to mean that the radio link quality of the serving link 512 is not sufficient for communication, e.g. below a quality threshold value, while in synchronisation can be understood to mean that the radio link quality of the serving link 512 is sufficient for communication, e.g. above a quality threshold value.

In step 604, the client device 100 obtains a second indication I2 indicating an outcome of a link re-configuration procedure associated with the serving link 512. The outcome of a link re-configuration procedure associated with the serving link 512 may be successful or unsuccessful. Hence, the second indication I2 may indicate a successful or an unsuccessful outcome of the link re-configuration procedure. An unsuccessful outcome of the link re-configuration procedure can in this disclosure be understood to mean that the link re-configuration procedure was not able to establish a new connection, while a successful outcome of the link re-configuration procedure can be understood to mean that the link re-configuration procedure was able to establish a new connection.

In embodiments where the serving link 512 comprises one or more beams, the link re-configuration procedure may correspond to a beam failure recovery procedure. In this case, an unsuccessful outcome of the link re-configuration procedure may mean that the beam failure recovery procedure failed, i.e. the beam failure recovery procedure was not able to establish a connection over a candidate beam. The beam failure recovery procedure may fail due to various reasons, e.g. no candidate beam could be identified, the radio link quality of an identified candidate beam was not sufficient for communication, the network access node 300 failed to receive the beam failure recovery request from the client device 100, or the client device 100 failed to receive the response to the beam failure recovery request from the network access node 300. On the other hand, a successful outcome of the link re-configuration procedure may mean that the beam failure recovery procedure succeeded, i.e. the beam failure recovery procedure was able to establish a connection over a candidate beam.

The method 600 may be iterative such that step 602 and step 604 may be performed any time a first indication I1 or a second indication I2 is generated and/or available. Thus, the client device 100 may repeatedly obtain a first indication I1 in step 602 or a second indication I2 in step 604. The first indications I1 and the second indications I2 may be obtained at different times or simultaneously, and in any sequence without deviating from the scope of the disclosure.

Based on the first indication I1 obtained in step 602 and the second indication I2 obtained in step 604, the client device 100 determines a value of a first counter C1 associated with the radio link failure timer T in step 606. As the method 600 is iterative, step 606 may comprise determining the value of the first counter C1 based on an initial value of the first counter C1, which may e.g. be zero, or based on a previous value of the first counter C1, which may be different from zero. The determination of the value of the first counter C1 in step 606 may comprise the client device 100 being configured to increase the value of the first counter C1, when the first indication I1 indicates that the serving link 512 is out of synchronization. According to embodiments of the disclosure the client device 100 may increase the value of the first counter C1 by an increment value, e.g. 1, if the first indication I1 indicates that the serving link 512 is out of synchronization. The determination of the value of the first counter C1 in step 606 may further comprise the client device 100 being configured to set the value of the first counter C1 to zero, when the first indication I1 indicates that the serving link 512 is in synchronization.

Moreover, the determination of the value of the first counter C1 in step 606 may comprise the client device 100 being configured to increase the value of the first counter C1 by an amount defined by a first increment parameter P1 when the second indication I2 indicates an unsuccessful outcome of the link re-configuration procedure; and decrease the value of the first counter C1 by an amount defined by a first decrement function F1 when the second indication I2 indicates a successful outcome of the link re-configuration procedure. By increasing the value of the first counter C1 when the second indication I2 indicates an unsuccessful outcome of the link re-configuration procedure, the start of the radio link failure timer T may be advanced. Thus, a failed link re-configuration will result in that the radio link failure timer T is started earlier than it would have been if only the outcome of the link monitoring procedure was considered. In addition, by adapting the first increment parameter P1 and thereby the amount with which the first counter C1 is increased, the start time of the radio link failure timer T may be optimized. By decreasing the value of the first counter C1 when the second indication I2 indicates a successful outcome of the link re-configuration procedure, the start of the radio link failure timer T may be postponed. Thus, a successful link re-configuration will result in that the radio link failure timer T is started later or not at all. In addition, by adapting the first decrement function F1 and thereby the amount with which the first counter C1 is decreased, the start time of the radio link failure timer T may be optimized.

According to embodiments of the disclosure the first decrement function F1 may comprises one of:
- a reduction of the value of the first counter C1 based on a first decrement function variable V1, e.g. F1(N)=N−V1, where N is the value of the first counter C1,
- a proportional scale-down of the value of the first counter C1 based on a first decrement function variable V1, e.g. F1(N)=(1−V1)*N, where N is the value of the first counter C1,
- a reset of the value of the first counter C1 to zero if a number of consecutive second indications I2 indicating a successful outcome of the link re-configuration procedure are obtained, wherein the number of consecutive second indications I2 is dependent on a first decrement function variable V1, e.g. F1(N)=0 if V1 consecutive second indications I2 are obtained, where N is the value of the first counter C1,
- a reset of the value of the first counter C1 to zero if a number of non-consecutive second indications I2 indicating a successful outcome of the link re-configuration procedure are obtained, wherein the number of non-consecutive second indications I2 is dependent on a first decrement function variable V1, e.g. F1(N)=0 if V1 non-consecutive second indications I2 are obtained, where N is the value of the first counter C1.

The first increment parameter P1, the first decrement function F1, and the first decrement function variable V1 may e.g. be pre-defined in the client device 100 or received from the network access node 300, as will be described below with reference to FIG. 8.

In step 608, the determined value of the first counter C1 is compared to a first counter threshold value $Th_{C1}$. The comparison is performed to check if the value of the first counter C1 is equal to or above the first counter threshold value $Th_{C1}$. The first counter threshold value $Th_{C1}$ may e.g. be pre-defined in the client device 100 or received from the network access node 300, as will be described below with reference with FIG. 8.

If the outcome of the check in step 608 is NO, i.e. the value of the first counter C1 is below the first counter threshold value $Th_{C1}$, the method 600 returns to step 606, as indicated in FIG. 6. In step 606, the client device 100 determines an updated value of the first counter C1 when a new first indications I1 or a new second indications I2 is obtained. On the other hand, if the outcome of the check in step 608 is YES, i.e. the value of the first counter C1 is equal to or above the first counter threshold value $Th_{C1}$, the method 600 moves to step 610. In step 610, the client device 100 starts the radio link failure timer T. Thus, the radio link failure timer T is started when the value of the first counter C1 reaches the first counter threshold value $Th_{C1}$. As the value of the first counter C1 is determined based on the first indication I1 and the second indication I2, the first counter C1 may be continuously adapted to changing radio link quality e.g. due to movement and/or beam blocking. Consequently, the start time of the radio link failure timer T may be optimized.

Once the radio link failure timer T is started, the client device 100 monitors the countdown of the radio link failure timer T and declares a radio link failure if the radio link failure timer T expires. To allow the radio link failure timer T to be stopped in case the radio conditions of the client device 100 is improved during the countdown of the radio link failure timer T, the disclosure provides embodiments for resetting the radio link failure timer T based on a second counter C2. The embodiments for resetting the radio link failure timer T based on the second counter C2 may be used independently of how the radio link failure timer T was started. The radio link failure timer T may e.g. have been started based on the first counter C1, based on a conventional counter, or in another way. In all these cases, once the radio link failure timer T has been started, the radio link failure timer T may be reset based on a second counter C2 according to embodiments of the disclosure.

Figure 7:
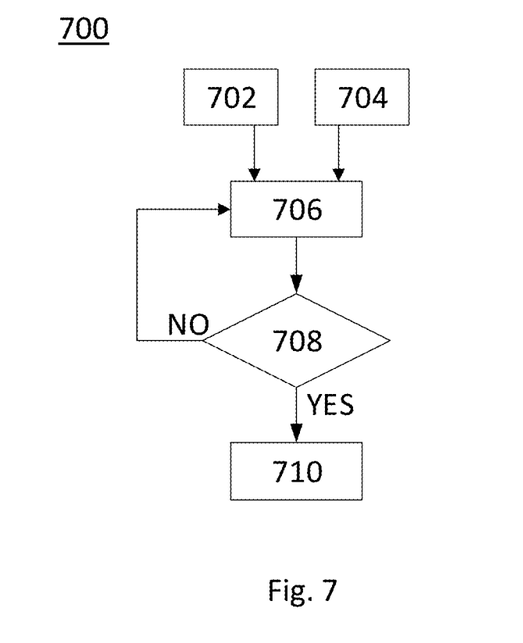
FIG. 7 shows a flow chart of a method for resetting a radio link failure timer according to an example of the disclosure.

FIG. 7 shows a flow chart of a method 700 for resetting a radio link failure timer T according to embodiments of the disclosure. In these embodiments, the radio link failure timer T is reset based a second counter C2, where the value of the second counter C2 is based on a first indication I1 and a second indication I2. The method 700 may be performed in a client device, such as e.g. the client device 100 shown in FIG. 1. Furthermore, method 700 may be performed by the client device 100 after the radio link failure timer T has been started. Step 702 and step 704 in FIG. 7 corresponds to step 602 and step 604 in FIG. 6, respectively. Hence, the client device 100 may obtain a first indication I1 in step 702, where the first indication I1 may indicate that the serving link 512 is out of synchronization or that the serving link 512 is in synchronization. The client device 100 may further obtain a second indication I2 in step 704, where the second indication I2 may indicate a successful or an unsuccessful outcome of the link re-configuration procedure.

Based on the first indication I1 obtained in step 702 and the second indication I2 obtained in step 704, the client device 100 determines a value of a second counter C2 associated with a radio link failure timer T in step 706. The determination of the value of the second counter C2 in step 706 may comprise the client device 100 being configured to increase the value of the second counter C2 if the first indication I1 indicates that the serving link 512 is in synchronization. In embodiments of the disclosure, the client device 100 may increase the value of the second counter C2 by an increment value, e.g. 1, if the first indication I1 indicates that the serving link 512 is in synchronization. The determination of the value of the second counter C2 in step 706 may further comprise the client device 100 being configured to set the value of the second counter C2 to zero if the first indication I1 indicates that the serving link 512 is out of synchronization.

Moreover, the determination of the value of the second counter C2 in step 706 may comprise the client device 100 being configured to increase the value of the second counter C2 by an amount defined by a second increment parameter P2 if the second indication I2 indicates a successful outcome of the link re-configuration procedure; and decrease the value of the second counter C2 by an amount defined by a second decrement function F2 if the second indication I2 indicates an unsuccessful outcome of the link re-configuration procedure. By increasing the value of the second counter C2 when the second indication I2 indicates a successful outcome of the link re-configuration procedure, the reset of the radio link failure timer T may be advanced. Thus, a successful link re-configuration will result in that the radio link failure timer T is reset earlier than it would have been if only the outcome of the link monitoring procedure was considered. In addition, by adapting the second increment parameter P2 and thereby the amount with which the second counter C2 is increased, the reset time of the radio link failure timer T may be optimized. By decreasing the value of the second counter C2 when the second indication I2 indicates an unsuccessful outcome of the link re-configuration procedure, the reset of the radio link failure timer T may be postponed. Thus, an unsuccessful link re-configuration will result in that the radio link failure timer T is reset later or not at all. In addition, by adapting the second decrement function F2 and thereby the amount with which the second counter C2 is decreased, the reset time of the radio link failure timer T may be optimized.

In a similar way as for the first decrement function F1, the second decrement function F2 may comprises one of:

a reduction of the value of the second counter C2 based on a second decrement function variable V2, e.g. $F2(N)=N-V2$, where N is the value of the second counter C2, a proportional scale-down of the value of the second counter C2 based on a second decrement function variable V2, e.g. $F2(N)=(1-V2)*N$, where N is the value of the second counter C2, a reset of the value of the second counter C2 to zero if a number of consecutive second indications I2 indicating an unsuccessful outcome of the link re-configuration procedure are obtained, wherein the number of consecutive second indications I2 is dependent on a second decrement function variable V2, e.g. $F2(N)=0$ if V2 consecutive second indications I2 are obtained, where N is the value of the second counter C2, a reset of the value of the second counter C2 to zero if a number of non-consecutive second indications I2 indicating an unsuccessful outcome of the link re-configuration procedure are obtained, wherein the number of non-consecutive second indications I2 is dependent on a second decrement function variable V2, e.g. $F2(N)=0$ if V2 non-consecutive second indications I2 are obtained, where N is the value of the second counter C2.

The second increment parameter P2, the second decrement function F2, and the second decrement function variable V2 may e.g. be pre-defined in the client device 100 or received from the network access node 300, as will be described below with reference to FIG. 8.

In step 708, the determined value of the second counter C2 is compared to a second counter threshold value $Th_{C2}$. The comparison is performed to check if the value of the second counter C2 is equal to or above the second counter threshold value $Th_{C2}$. The second counter threshold value $Th_{C2}$ may e.g. be pre-defined in the client device 100 or received from the network access node 300, as will be described below with reference with FIG. 8.

If the outcome of the check in step 708 is NO, i.e. the value of the second counter C2 is below the second counter threshold value $Th_{C2}$, the method 700 returns to step 706, as indicated in FIG. 7. In step 706, the client device 100 determines an updated value of the second counter C2 when a new first indications I1 or second indications I2 is obtained. On the other hand, if the outcome of the check in step 708 is YES, i.e. the value of the second counter C2 is equal to or above the second counter threshold value $Th_{C2}$, the method 700 moves to step 710. In step 710, the client device 100 resets the radio link failure timer T. Hence, the radio link failure timer T is reset when the value of the second counter C2 reaches the second counter threshold value $Th_{C2}$. As the value of the second counter C2 is determined based on the first indication I1 and the second indication I2, the second counter C2 may be continuously adapted to changing radio link quality e.g. due to movement and/or beam blocking. Consequently, the reset time of the radio link failure timer T may be optimized.

As previously mentioned the thresholds, parameters, and variables used to determine the first counter C1 and the second counter C2, may e.g. be pre-defined in the client device 100 or received from the network access node 300. In embodiments where at least one of the thresholds, parameters, and variables is pre-defined in the client device 100, the pre-defined thresholds, parameters, or variables may e.g. be pre-defined by a standard. Hence, at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2 may be pre-defined in the client device 100, e.g. by a standard.

In embodiments where at least one of the thresholds, parameters, and variables is received from the network access node 300, the network access node 300 may determine and transmit the at least one of the thresholds, parameters, and variables in a control message 502. Such an embodiment will now be described with reference to FIG. 8. In a first step I in FIG. 8, the network access node 300 determines at least one of a first counter threshold value $Th_{C1}$, a second counter threshold value $Th_{C2}$, a first increment parameter P1, a second increment parameter P2, a first decrement function variable V1, a second decrement function variable V2, a first decrement function F1, and a second decrement function F2 for adjusting a value of a first counter C1 or a value of a second counter C2 associated with a radio link failure timer T of a client device 100. The value of the first counter C1 and the value of the second counter C2 may be determined based on a first indication I1 indicating an outcome of a link monitoring procedure associated with a serving link 512 between the network access node 300 and the client device 100 and a second indication I2 indicating an outcome of a link re-configuration procedure associated with the serving link 512, as previously described with reference to FIGS. 6-7.

Figure 8:
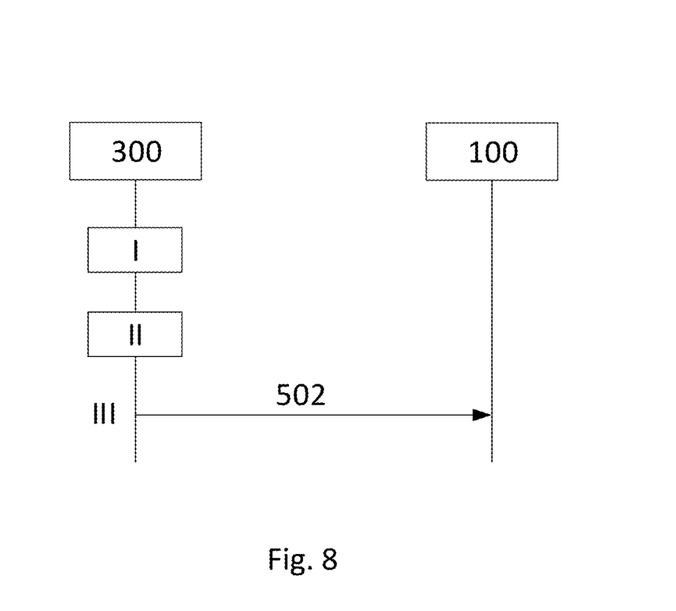
FIG. 8 shows signalling between a client device and a network access node according to an example of the disclosure.

The determination by the network access node 300 in step I in FIG. 8 may be based on different types of information. For example, the network access node 300 may determine at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2 based on statistics of radio link failure declarations for the client device 100, based on statistics of handover operations for the client device 100, based on location information and/or speed information of the client device 100, or based on a load and radio resources of the network access node 300. Further information used by the network access node 300 to determine at least one of the thresholds, parameters, and variables in step I in FIG. 8 may be characteristic information about the radio environment where the client device 100 is located. Such characteristic information may include density of scatters, reflection surfaces, statistics information of the number of candidate beam, and statistics information of the quality of candidate beams of the radio environment. In addition, the network access node 300 may combine one or more of the different types of information mentioned and base the determination in step I in FIG. 8 on the combined information.

In step II in FIG. 8, the network access node 300 generates a control message 502 indicating at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2 determined in step I in FIG. 8.

The network access node 300 transmits the generated control message 502 to the client device 100, in step III in FIG. 8. The client device 100 receives the control message 502 from the network access node 300, wherein the control message 502 indicates at least one of the first counter threshold value $Th_{C1}$, the second counter threshold value $Th_{C2}$, the first increment parameter P1, the second increment parameter P2, the first decrement function variable V1, the second decrement function variable V2, the first decrement function F1, and the second decrement function F2. Thus, the client device 100 may extract the at least one threshold, parameter, and variable from the control message 502 and use the at least one threshold, parameter, and variable when determining the value of the first counter C1 and/or the value of the second counter C2.

The embodiment described with reference to FIG. 8 enables the network access node 300 to determine the radio link failure behaviour of the client device 100 and thereby control the internal process and behaviour of the client device 100.

The client device 100 herein, may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability.

The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network access node 300 herein may also be denoted as a radio network access node, an access network access node, an access point, or a base station, e.g. a Radio Base Station (RBS), which in some networks may be referred to as transmitter, "gNB", "gNodeB", "eNB", "eNodeB", "NodeB" or "B node", depending on the technology and terminology used. The radio network access nodes may be of different classes such as e.g. macro eNodeB, home eNodeB or pico base station, based on transmission power and thereby also cell size. The radio network access node can be a Station (STA), which is any device that contains an IEEE 802.11-conformant Media Access Control (MAC) and Physical Layer (PHY) interface to the Wireless Medium (WM). The radio network access node may also be a base station corresponding to the fifth generation (5G) wireless systems.

Furthermore, any method according to embodiments of the disclosure may be implemented in a computer program, having code means, which when run by processing means causes the processing means to execute the steps of the method. The computer program is included in a computer readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network access node 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the client device 100 and the network access node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

The invention claimed is:

1. A client device, comprising:
   at least one processor; and
   a non-transitory computer-readable storage medium having computer readable instructions stored thereon that, when executed by the at least one processor, cause the client device to:
   obtain a first indication indicating an outcome of a link monitoring procedure associated with a serving link between a network access node and the client device;
   obtain a second indication indicating an outcome of a link re-configuration procedure associated with the serving link;
   determine a value of a first counter associated with a radio link failure timer based on the first indication and the second indication; and start the radio link failure timer when the value of the first counter is equal to or larger than a first counter threshold value;

determine a value of a second counter associated with the radio link failure timer based on the first indication and the second indication;

reset the radio link failure timer when the value of the second counter is equal to or larger than a second counter threshold value; and decrease the value of the first counter by an amount defined by a first decrement function when the second indication indicates a successful outcome of the link re-configuration procedure, wherein the first decrement function comprises one of:

a reset of the value of the first counter to zero when a number of consecutive second indications indicating a successful outcome of the link re-configuration procedure are obtained, wherein the number of consecutive second indications is dependent on a first decrement function variable; or a reset of the value of the first counter to zero when a number of non-consecutive second indications indicating a successful outcome of the link re-configuration procedure are obtained, wherein the number of non-consecutive second indications is dependent on the first decrement function variable.

2. The client device according to claim 1, wherein the client device is further caused to:

increase the value of the first counter when the first indication indicates that the serving link is out of synchronization; or set the value of the first counter to zero when the first indication indicates that the serving link is in synchronization.

3. The client device according to claim 1, wherein the client device is further caused to:

increase the value of the first counter by an amount defined by a first increment parameter when the second indication indicates an unsuccessful outcome of the link re-configuration procedure.

4. The client device according to claim 1, wherein the client device is further caused to:

increase the value of the second counter when the first indication indicates that the serving link is in synchronization; or set the value of the second counter to zero when the first indication indicates that the serving link is out of synchronization.

5. The client device according to claim 1, wherein the client device is further caused to one or more of:

increase the value of the second counter by an amount defined by a second increment parameter when the second indication indicates a successful outcome of the link re-configuration procedure; or decrease the value of the second counter by an amount defined by a second decrement function when the second indication indicates an unsuccessful outcome of the link re-configuration procedure.

6. The client device according to claim 5, wherein the second decrement function comprises one of:

a reduction of the value of the second counter based on a second decrement function variable;

a proportional scale-down of the value of the second counter based on a second decrement function variable;

a reset of the value of the second counter to zero when a number of consecutive second indications indicating an unsuccessful outcome of the link re-configuration procedure are obtained, wherein the number of consecutive second indications is dependent on a second decrement function variable;

a reset of the value of the second counter to zero when a number of non-consecutive second indications indicating an unsuccessful outcome of the link re-configuration procedure are obtained, wherein the number of non-consecutive second indications is dependent on a second decrement function variable.

7. The client device according to claim 3, wherein the client device is further caused to:

receive a control message from the network access node, wherein the control message indicates at least one of a first counter threshold value, a second counter threshold value, the first increment parameter, a second increment parameter, a first decrement function variable, a second decrement function variable, a first decrement function, and a second decrement function.

8. A method for a client device, the method comprising:

obtaining a first indication indicating an outcome of a link monitoring procedure associated with a serving link between a network access node and the client device;

obtaining a second indication indicating an outcome of a link re-configuration procedure associated with the serving link;

determining a value of a first counter associated with a radio link failure timer based on the first indication and the second indication;

starting the radio link failure timer when the value of the first counter is equal to or larger than a first counter threshold value;

determining a value of a second counter associated with the radio link failure timer based on the first indication and the second indication;

resetting the radio link failure timer when the value of the second counter is equal to or larger than a second counter threshold value; and decreasing the value of the first counter by an amount defined by a first decrement function when the second indication indicates a successful outcome of the link re-configuration procedure, wherein the first decrement function comprises one of:

a reset of the value of the first counter to zero when a number of consecutive second indications indicating a successful outcome of the link re-configuration procedure are obtained, wherein the number of consecutive second indications is dependent on a first decrement function variable; or a reset of the value of the first counter to zero when a number of non-consecutive second indications indicating a successful outcome of the link re-configuration procedure are obtained, wherein the number of non-consecutive second indications is dependent on the first decrement function variable.

9. The method according to claim 8, further comprising:

increasing the value of the first counter when the first indication indicates that the serving link is out of synchronization; or setting the value of the first counter to zero when the first indication indicates that the serving link is in synchronization.

10. The method according to claim 8, further comprising:

increasing the value of the first counter by an amount defined by a first increment parameter when the second indication indicates an unsuccessful outcome of the link re-configuration procedure.

* * * * *